US 8,452,733 B2

(12) United States Patent
Chan et al.

(10) Patent No.: US 8,452,733 B2
(45) Date of Patent: May 28, 2013

(54) DATA DECAY MANAGEMENT

(75) Inventors: Cynthia Mee Yee Chan, San Jose, CA (US); Chetana Jain, Sunnyvale, CA (US); Wenxin Li, Foster City, CA (US); Haidong Song, San Ramon, CA (US); Manoj Tahiliani, Mountain View, CA (US)

(73) Assignee: Oracle International Corporation, Redwood Shores, CA (US)

( * ) Notice: Subject to any disclaimer, the term of this patent is extended or adjusted under 35 U.S.C. 154(b) by 349 days.

(21) Appl. No.: 12/253,788

(22) Filed: Oct. 17, 2008

(65) Prior Publication Data

US 2010/0114836 A1 May 6, 2010

(51) Int. Cl.
*G06F 17/30* (2006.01)

(52) U.S. Cl.
CPC .................................. *G06F 17/30* (2013.01)
USPC ........... 707/662; 709/202; 709/228; 709/233; 709/236

(58) Field of Classification Search
CPC ...... G06F 17/30; G06F 17/30958; H03M 7/30; H04L 29/08
See application file for complete search history.

(56) References Cited

U.S. PATENT DOCUMENTS

| | | | | | |
|---|---|---|---|---|---|
| 4,780,845 | A | * | 10/1988 | Threewitt | 365/49.1 |
| 5,572,628 | A | * | 11/1996 | Denker et al. | 706/25 |
| 5,699,246 | A | * | 12/1997 | Plasek et al. | 702/11 |
| 5,880,830 | A | * | 3/1999 | Schechter | 356/318 |
| 5,890,115 | A | * | 3/1999 | Cole | 704/258 |
| 6,052,185 | A | * | 4/2000 | Banet et al. | 356/450 |
| 6,158,381 | A | * | 12/2000 | Bray | 116/216 |
| 6,185,385 | B1 | * | 2/2001 | Mestha et al. | 399/49 |
| 6,203,993 | B1 | * | 3/2001 | Shuber et al. | 435/6.11 |
| 6,300,077 | B1 | * | 10/2001 | Shuber et al. | 435/6.11 |
| 6,507,802 | B1 | * | 1/2003 | Payton et al. | 702/150 |
| 6,575,751 | B1 | * | 6/2003 | Lehmann et al. | 433/223 |
| 6,612,842 | B2 | * | 9/2003 | Wen et al. | 434/118 |
| 6,616,051 | B1 | * | 9/2003 | Zidon | 235/487 |
| 6,681,247 | B1 | * | 1/2004 | Payton | 709/217 |
| 6,928,391 | B2 | * | 8/2005 | Fujiyama et al. | 702/185 |
| 7,136,856 | B2 | * | 11/2006 | Birbo et al. | 1/1 |
| 7,190,163 | B2 | * | 3/2007 | Rajagopalan et al. | 324/309 |
| 7,216,046 | B2 | * | 5/2007 | Agoston et al. | 702/70 |
| 7,505,969 | B2 | * | 3/2009 | Musgrove et al. | 1/1 |
| 7,512,612 | B1 | * | 3/2009 | Akella et al. | 1/1 |
| 7,539,697 | B1 | * | 5/2009 | Akella et al. | 1/1 |
| 7,626,537 | B2 | * | 12/2009 | Andrusiak et al. | 342/177 |
| 8,107,328 | B1 | * | 1/2012 | Liu et al. | 369/44.13 |
| 8,165,881 | B2 | * | 4/2012 | Kirsch et al. | 704/260 |
| 8,166,032 | B2 | * | 4/2012 | Sommer et al. | 707/736 |
| 8,176,186 | B2 | * | 5/2012 | McCanne et al. | 709/228 |
| 8,267,311 | B2 | * | 9/2012 | Cleary et al. | 235/375 |
| 8,321,317 | B2 | * | 11/2012 | Hansen | 705/35 |
| 2002/0199193 | A1 | * | 12/2002 | Gogoi et al. | 725/46 |

(Continued)

*Primary Examiner* — Farhan Syed
(74) *Attorney, Agent, or Firm* — Kilpatrick Townsend & Stockton LLP

(57) ABSTRACT

Embodiments presented herein provide systems and methods for managing data decay. A system is provided for maintaining metadata about data attributes or relationships between data. A data decay engine can read the metadata and perform a decay calculation. The type of decay calculation can be associated with the type of data or be determined from user inputs. The decay engine can provide a score as to the staleness of the data. An update engine can determine specific data attributes that may require updating. The update engine may be able to update the data from external data sources.

18 Claims, 8 Drawing Sheets

U.S. PATENT DOCUMENTS

| | | | |
|---|---|---|---|
| 2003/0135490 A1* | 7/2003 | Barrett et al. | 707/3 |
| 2003/0191606 A1* | 10/2003 | Fujiyama et al. | 702/185 |
| 2004/0186673 A1* | 9/2004 | Agoston et al. | 702/70 |
| 2005/0221401 A1* | 10/2005 | Nomura et al. | 435/7.32 |
| 2006/0020424 A1* | 1/2006 | Quindel | 702/183 |
| 2006/0265435 A1* | 11/2006 | Denissov | 707/204 |
| 2008/0320151 A1* | 12/2008 | McCanne et al. | 709/228 |
| 2009/0051583 A1* | 2/2009 | Andrusiak et al. | 342/177 |
| 2009/0106178 A1* | 4/2009 | Chu | 706/14 |
| 2009/0172058 A1* | 7/2009 | Cormode et al. | 708/274 |
| 2009/0327347 A1* | 12/2009 | Hoang et al. | 707/104.1 |
| 2010/0057464 A1* | 3/2010 | Kirsch et al. | 704/260 |
| 2010/0070700 A1* | 3/2010 | Borst et al. | 711/113 |
| 2010/0114836 A1* | 5/2010 | Chan et al. | 707/662 |
| 2010/0138370 A1* | 6/2010 | Wu et al. | 706/12 |
| 2010/0262454 A1* | 10/2010 | Sommer et al. | 705/10 |
| 2011/0006110 A1* | 1/2011 | Cleary et al. | 235/375 |
| 2011/0052423 A1* | 3/2011 | Gambier et al. | 417/63 |
| 2012/0066262 A1* | 3/2012 | Greenberg | 707/784 |
| 2012/0095995 A1* | 4/2012 | Aravamudan et al. | 707/724 |
| 2012/0144280 A1* | 6/2012 | Deng et al. | 715/202 |
| 2012/0197965 A1* | 8/2012 | McCanne et al. | 709/202 |
| 2012/0221563 A1* | 8/2012 | De et al. | 707/728 |
| 2012/0233056 A1* | 9/2012 | Hansen | 705/37 |
| 2013/0001299 A1* | 1/2013 | Cleary et al. | 235/375 |

* cited by examiner

DATA DECAY MANAGEMENT

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Today, many organizations manage large amounts of data. For example, companies may have data about the customers for which the company sells goods or services. This customer information can help the company provide further services or sell additional goods. However, data generally becomes outdated. Customers move or change phone numbers causing the data in the company's database to become incorrect. This trend of data becoming outdated over time is referred to as the data becoming stale or the data decaying.

Organizations and companies with large databases understand that stale data permeates the databases that the organization uses. However, organizations often do not know the severity of the staleness or which items of data require updating. Thus, organizations often make decisions based upon stale data and, sometimes, those decisions are incorrect because the foundations of the decisions, the stale data, are incorrect.

It is in light of these and other considerations that the present application is being presented.

BRIEF SUMMARY

Embodiments presented herein provide systems and methods for managing data decay. A system is provided for maintaining metadata about data attributes or relationships between data. A data decay engine can read the metadata and perform a decay calculation. The type of decay calculation can be associated with the type of data or be determined from user inputs. The decay engine, provides a score as to the staleness of the data. An update engine can determine specific data attributes that may require updating. The update engine may be able to update the data from external data sources.

This Summary is offered to provide a simplified description of one or more embodiments. This Summary is not meant to limit the scope of the embodiments. Rather, the possible embodiments are as defined by the claims attached herein.

BRIEF DESCRIPTION OF THE DRAWINGS

Various embodiments in accordance with the present disclosure will be described with reference to the drawings, in which.

DETAILED DESCRIPTION

Systems and methods in accordance with various embodiments overcome the aforementioned and other deficiencies in the processes and systems for managing data decay in a database. The following description includes some possible embodiments. However, one skilled in the art will recognize that the invention is not limited to the embodiments disclosed herein. Rather, the possible embodiments are defined by the claim attached hereto. A data within a database becomes outdated. For example, as customers move or change phone numbers, the data in a customer database becomes incorrect because the database includes the previous address or phone number. With thousands or millions of customers, the data within the database constantly becomes outdated. Data that has not been updated for a period of time is referred to as stale data.

The system provides metadata that is associated with one or more data attribute or relationship between one item of data and one or more other items of data. A data attribute may be a characteristic of the data or an item of data. For example, a data attribute may be the date the customer last provided his or her address or may be the customer's address. A decay engine in the database reads the metadata. From the metadata, the decay engine determines how long since the data attribute was updated. By analyzing the data in a predefined calculation, the decay engine can determine if the data is stale. The decay engine can then fold up the attribute decay determinations into a database wide determination of data staleness. For example, the decay engine can determine that any data attribute not updated in the last six months is stale. The decay engine can then determine the number of database attributes that are stale. The number of stale attributes may equate to the staleness of the entire database.

The database updates stale data. For example, if a customer's address is stale, the database accesses a public resource to update the address. The database, for example, accesses a credit reporting agency to determine if the reporting agency has a more recent address. If the address is more recent, the database can read the address information and replace the existing address with the read address from the credit reporting agency. Managing the decay of the data in an organization's database provides the advantage of knowledge of how "up-to-date" a database is. This insight can lead to changes in data collection or refreshment for the organization. Further, the organization can determine the staleness of specific data before using the data in a decision process. Thus, the organization can alleviate faulty assumptions.

Figure 1:
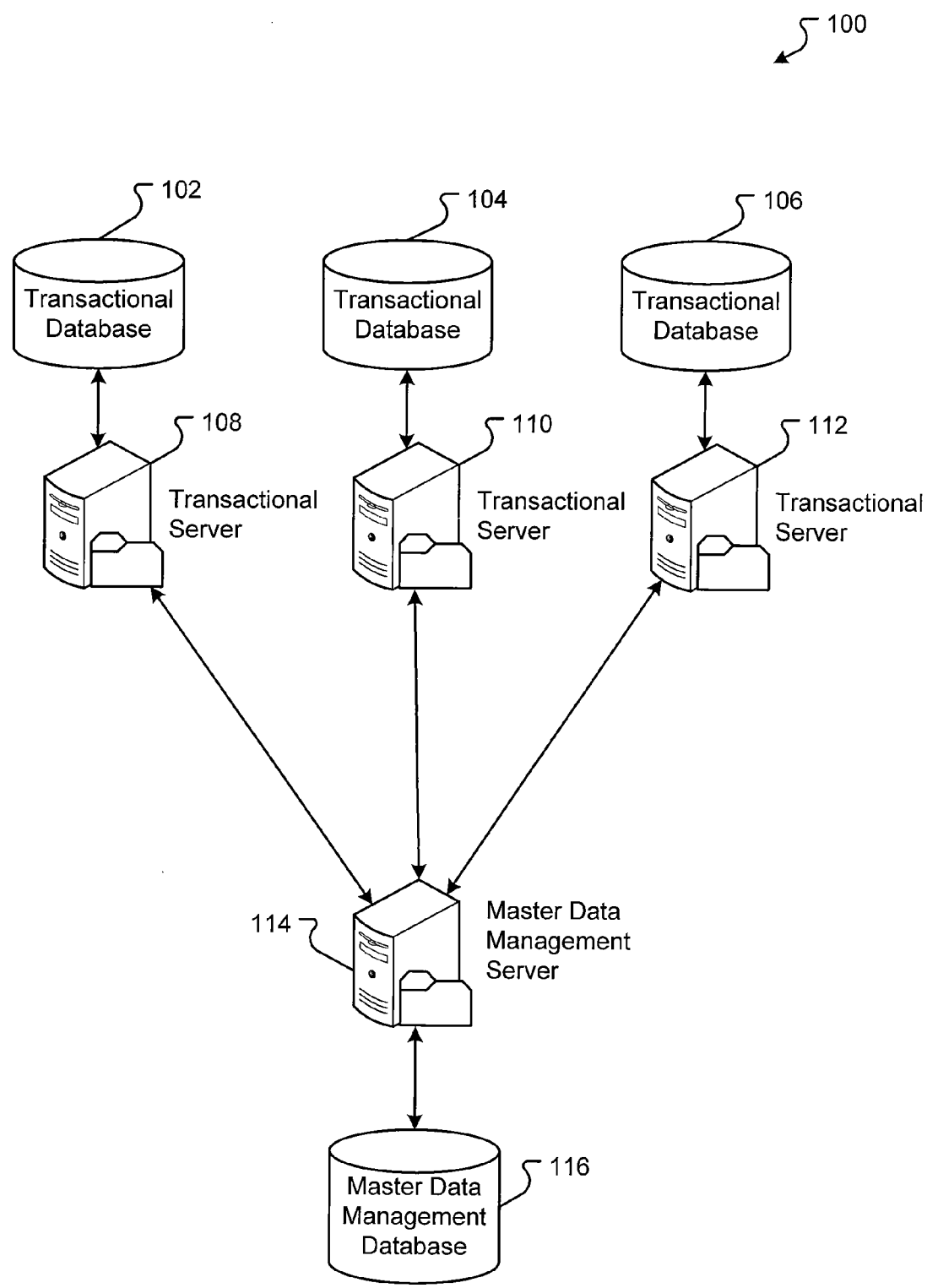
FIG. 1 is a block diagram of an embodiment of a Master Data Management (MDM) database system.

A block diagram of a database system 100 that provides a data decay management is shown in FIG. 1. The database system 100 can include one or more transactional databases 102, 104, and/or 106. The transactional database 102, 104, and/or 106 is a database storing information for database users. The transactional database 102, 104, or 106 can include any type of data stored in any type of storage configuration (e.g., hierarchical file, flat file, etc.) on a storage medium, as explained in conjunction with F*igs*. 6 and 7. Each transactional database 102, 104, or 106 may be associated with a certain type of data. For example, each transactional database 102, 104, or 106 is associated with a business unit (e.g., the wireless service business unit, the home phone service business unit, etc.). Embodiments of the transactional database 102, 104, or 106 stores one or more items of data and can provide the data to a transactional server 108, 110, or 112.

The transactional server 108, 110, or 112 is a computing system, as explained in conjunction with F*igs*. 6 and 7. The transactional server 108, 110, or 112 may run a database software application that allows a user to access the data in the transactional database 102, 104, or 106. The database application creates a data object hierarchy, as explained in conjunction with F*ig*. 8. The data object hierarchy can retrieve one or more items of data from a data file, as explained in conjunction with F*ig*. 8. The transactional server 108, 110, or 112 provides the user with the ability to change data, add data, delete data, query data, and complete various other database functions. The items of data are stored in the transactional database 102, 104, or 106 by the transactional server 108, 110, or 112.

The one or more transactional servers 108, 110, or 112 are in communication with a Master Data Management (MDM) server 114. The MDM server 114 is a computing system, as explained in conjunction with F*igs*. 6 and 7. The MDM server 114, similar to the transactional server 108, 110, or 112, may run a database software application. However, unlike the transactional server 108, 110, or 112, the MDM server 114 can provide access to organizational-wide data. In other words, the MDM server 114 can include all the data stored at the separate transactional servers 108, 110, or 112, while the separate transactional servers 108, 110, or 112 may store different data. The MDM server 114 links to each transactional server 108, 110, or 112 to retrieve the transactional data from the transactional server 108, 110, or 112 and store the data into a MDM database 116. This structure allows separate business units to manage smaller more focused databases and includes one MDM server 114 that manages data across the entire organization.

The database application executed by the MDM server 114 creates a data object hierarchy, as explained in conjunction with F*ig*. 8. The data object hierarchy can retrieve one or more items of data from a data file, as explained in conjunction with F*ig*. 8. The MDM server 114 can provide the user with the ability to change data, add data, delete data, query data, and complete various other database functions against company-wide data. Any action performed by a transactional server 108, 110, or 112 can be mirrored by the MDM server 114 and any action performed by the MDM server 114 can be mirrored by the transactional server 108, 110, or 112. In other words, if a change to data is made at the transactional server 108, 110, or 112 the MDM server 114 receives notice of the change and applies the change to the same data stored at the MDM server 114. This process also works in reverse if a change is made at the MDM server 114. The items of data are stored in the MDM database 116 by the MDM server 114.

The MDM database 116 is a database storing organizational-wide information for database users. The MDM database 116 can include any type of data stored in any type of storage configuration (e.g., hierarchical file, flat file, etc.) on a storage medium, as explained in conjunction with F*igs*. 6 and 7. The MDM database 116 includes all the data stored in the transactional databases 102, 104, and/or 106.

The MDM database 116 can consist of one or more different layers and/or types of objects. For example, the database may consist of one or more data objects in a logic layer and one or more data files in a data layer. The objects in the logic layer provide the logic or methods that allow the database to function. The data layer provides files for storing records or instances of data. For example, one customer's data can be stored in a first data file while another customer's data can be stored in a second data file. The database may also consist of other objects and data, for example, data history objects with associated history data files and integration objects with associated integration data. Data history objects and history data can include data and/or metadata associated about the data. Integration objects and integration data are associated with linking the data in the MDM database 116 and the one or more transactional databases 102, 104, and/or 106

Figure 2:
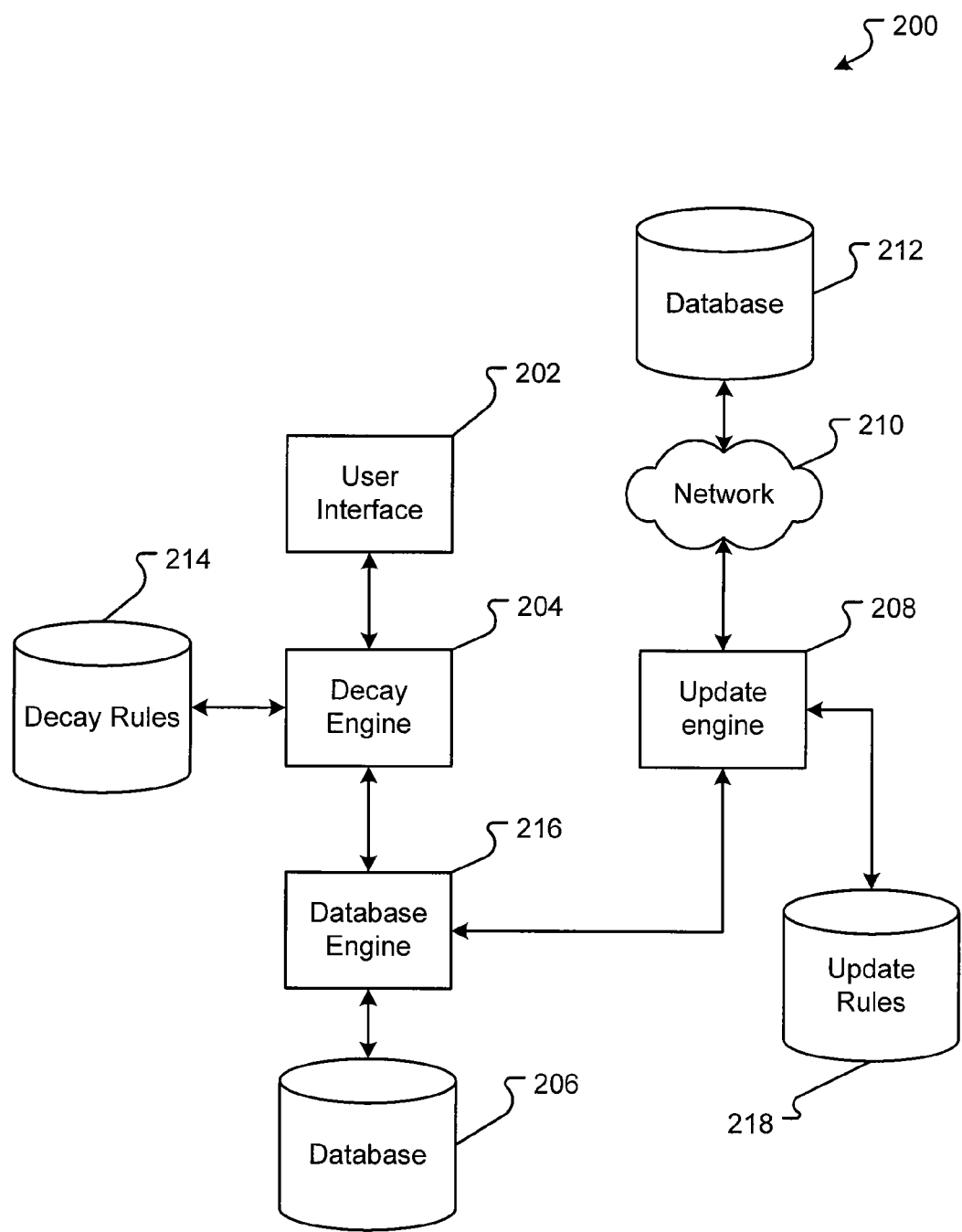
FIG. 2 is a block diagram of an embodiment of decay management system for managing the decay of data.

An embodiment of a database system 200 is shown in FIG. 2. In embodiments, the database 206 is similar to or the same as database 116 (FIG. 1). However, database 206 may represent database 102, 104, or 106 (FIG. 1). Database 206 stores data or metadata for an enterprise. The database system 200 comprises one or more software components that can update the database 206 or determine decay in the database 206. However, in alternative embodiments, the database system 200 comprises hardware or hardware and software components. The database system 200 allows a database administrator to determine and manage data decay in the database system 100 (FIG. 1). The data decay may be determined from the MDM database 116 (FIG. 1), but, in other embodiments, the data decay may be determined from one or more of the transactional databases 102, 104, or 106 (FIG. 1).

The database system 200 comprises a decay engine 204. The decay engine 504 204 determines the amount of decay in the database 206. The decay engine 204 can provide information about the data decay to a user interface 202. The user interfaces 202 can include one or more windows rendered on a user interface 202 that is in communication with the decay engine 204. The user interface 202 may be as explained in conjunction with FIGS. 9 and 10. The decay engine 204 receives one or more inputs from the database administrator in the user interface 202 that represent how the data decay should be calculated. These rules are stored in the decay rules database 214. The decay engine 204 retrieves these rules from the decay rules database 214 to determine the data decay.

The database system 200 further includes an update engine 208. The update engine 208 determines if an attribute or item of data can be updated and updates the item of data in the database 206. The update engine 208 can retrieve information from one or more external databases 212 over a network 210. The external databases 212 may be a public database, for example, the State Department of Motor Vehicle, a private database, for example, a credit agency database, or some other database that can be accessed by the database system 200. The network 210 may be a local area network (LAN), wide area network (WAN), the Internet, or some other network. The update engine 208 accesses or receives one or more inputs from the database engine 216. For example, the update engine 208 receives which database attributes to update. In other embodiments, the update engine 208 determines which database data can be updated by querying the database engine 216. A database administrator may determine which database data to update and provide the determinations to the update engine 208. The update engine 208 stores and retrieves these update rules 218.

A database engine 216 is in communication with the decay engine 204 and/or the update engine 208. The database engine 216 receives inputs from the decay engine 204 and/or the update engine 208 to determine data decay and update decayed data. The database engine 216 can retrieve data and/or update data or metadata based on the inputs from the decay engine 204 and/or the update engine 208. The database engine 216 stores the data in the database 206. The database engine 216 also retrieves data from the database 206 to determine data decay or update data.

Figure 3:
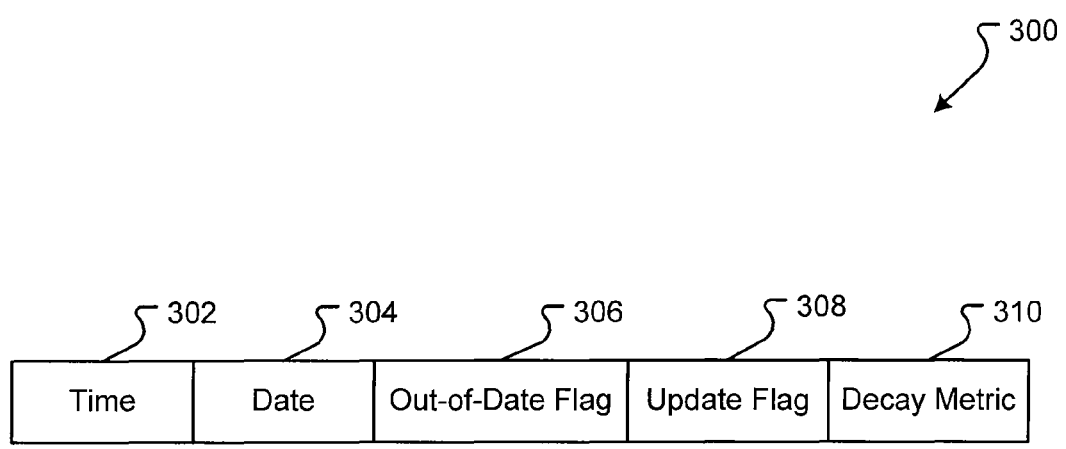
FIG. 3 is a block diagram of an embodiment of metadata stored to determine data decay.

An embodiment of a data structure 300 is shown in FIG. 3. The data structure 300 is data or metadata stored in the database 206 (FIG. 2). In another embodiment, the data structure 300 is metadata stored database items. The data structure 300 can include one or more items of data that, when retrieved and executed by a computer system, can cause the computer system to complete a method or process.

The data structure 300 contains data associated with data decay. The data 300 can be associated with an item of data or a relationship between two or more items of data. For example, the decay data 300 may be related to the staleness of a customer's address. In another example, the decay data 300 may be related to the relationship between a customer's home phone and the customer's address. The decay data 300 can include one or more of, but is not limited to, a time stamp data field 302, a date stamp data field 304, an out-of-date flag data field 306, an update flag data field 308, and/or a decay metric data field 310. These fields are described hereinafter.

A time stamp data field 302 may include the time of day that a data attribute was stored or updated. The time stamp data field 302 is the hour, minute, and second that a data item was created. The time stamp data field 302 includes a time stamp for when the data was first stored and one or more time stamps for when the data was updated. Thus, the time stamp data field 302 can include a log of time stamps representing a list of changes for the data item. If the data 300 is associated with a relationship between items of data, the time stamp may be the time when any of the data was changed. In another embodiment, the time stamp may be the time for the oldest change for any of the data associated with the relationship.

A date stamp data field 304 may include the day of the year that a data attribute was stored or updated. The date stamp data field 304 is the day of year, e.g., day 125. The date stamp data field 304 includes a date stamp for when the data was first stored and one or more date stamps for when the data was updated. Thus, the date stamp data field 304 can include a log of date stamps representing a list of changes for the data item. If the data 300 is associated with a relationship between items of data, the date stamp may be the date when any of the data was changed. In another embodiment, the date stamp may be the date for the oldest change for any of the data associated with the relationship. With the time stamp 302, the date stamp 304 provides the time history for changes to data. The time stamp 302 and date stamp 304 can be used to determine if the data is stale or decayed.

An out-of-date flag 306 is optional. The out-of-date flag 306 can be a binary data point where if the update engine 208 (FIG. 2) or the data decay engine 204 (FIG. 2) determines that the data is stale and/or should be updated. The update engine 208 (FIG. 2) or the data decay engine 204 (FIG. 2) compares a decay metric against a threshold. If the decay metric is over a threshold, the data is out-of-date and the update engine 208 (FIG. 2) or the data decay engine 204 (FIG. 2) sets the out-of-date flag 306.

The update flag 308 is also optional. The update flag 308 is set by the either the update engine 208 (FIG. 2) or the data decay engine 204 (FIG. 2) to show that the data should be updated. Alternatively, the update flag 308 is set if the out-of-date flag 306 is set. Setting the update flag 308 or the out-of-date flag 306 can signal the update engine 208 (FIG. 2) that the data should be updated. In other embodiments, a database administrator sets the update flag 308. Setting the update flag 308 acknowledges that this item of data can and/or should be updated. Thus, if the out-of-date flag 306 is set by the update engine 208 (FIG. 2) or the data decay engine 204 (FIG. 2) and the database administrator has set the update flag 308, the update engine 208 (FIG. 2) will update the item of data.

The data 300 also includes a decay metric 310. The decay metric 310 can represent a numeric value for the staleness or decay of the data. The data decay engine 204 (FIG. 2) can calculate the decay metric according to the decay rules and store the result as the decay metric 310. The decay metric 310 may later be retrieved to determine the decay of the database as a whole. Further, the decay metric 310 can be used to determine if the update engine 208 (FIG. 2) should update the data. For example, if the decay metric 310 is over a threshold, the update engine 208 (FIG. 2) updates the data associated with the decay metric 310. The decay metric 310 may also include a time/date stamp and/or a flag that represents that the decay metric 310 needs updating. In other words, there may be decay information from the decay metric 310.

Figure 4:
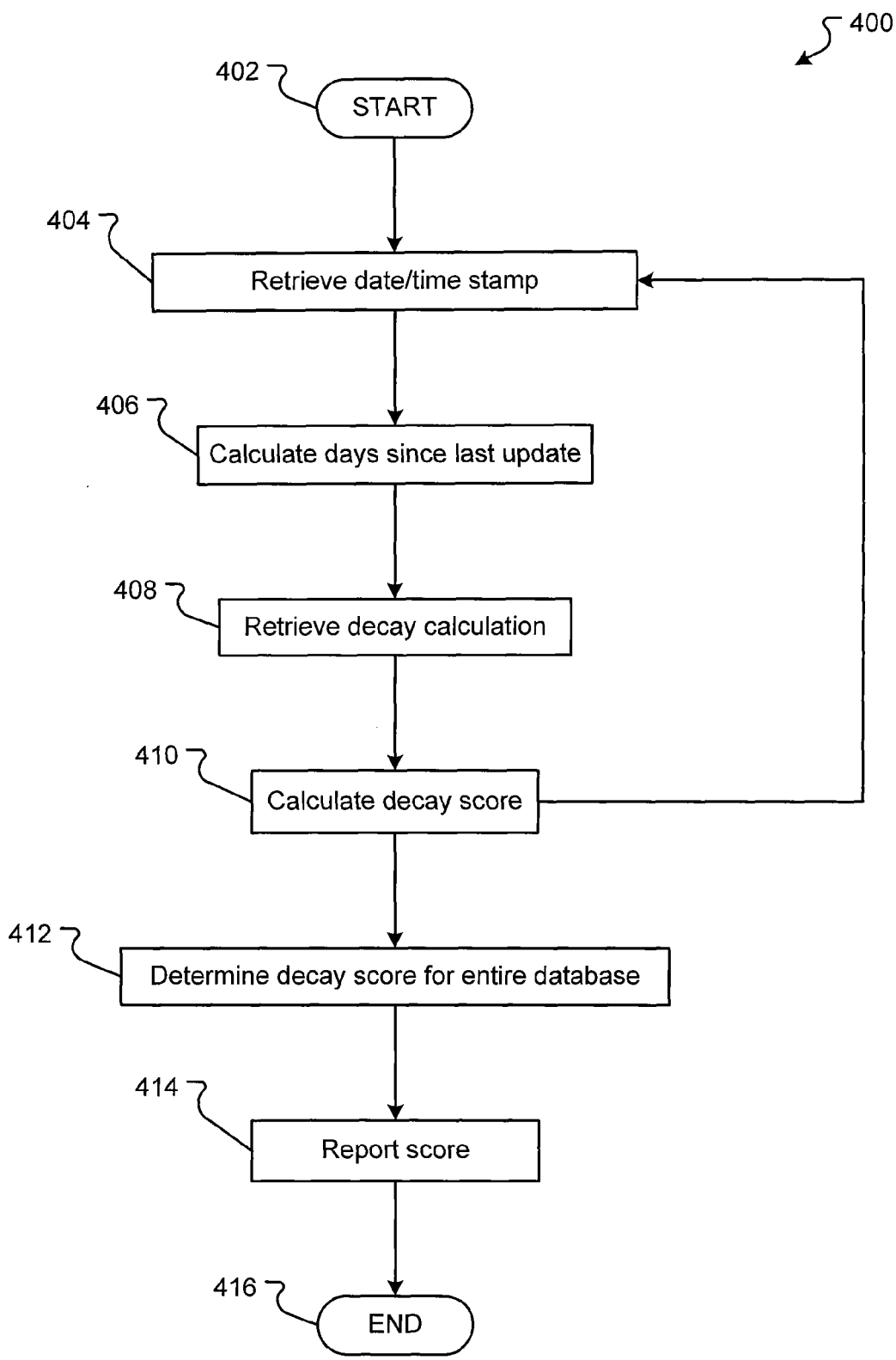
FIG. 4 is a flow diagram of an embodiment of a method for determining data decay.

An embodiments of a method 400 for determining data decay is shown in FIG. 4. The method 400 generally begins with a START operation 402 and terminates with an END operation 416. The steps shown in the method 400 may be executed in a computer system as a set of computer executable instructions. While a logical order is shown in FIG. 4, the steps shown or described can, in some circumstances, be executed in a different order than presented herein. The method 400 can be automatically executed after a predefined period of time on a periodic basis, for example, once a week or once a month. In another embodiment, a database administrator starts the method by requesting a data decay update in user interface 202 (FIG. 2). The method 400 will be explained with respect to the system of FIG. 2 and the example of a data structure in FIG. 3.

A decay engine 205 (FIG. 2) retrieves the date stamp 304 (FIG. 3) and/or the time stamp 302 in step 404. The decay engine 205 (FIG. 2) can request the data from the database engine 216 (FIG. 2), and the database engine 216 (FIG. 2) retrieves one or more items of data from the database 206 (FIG. 2). If the data decay relates to a relationship, the most recent or oldest date/time stamp for any of the data involved in the relationship is retrieved.

The decay engine 205 (FIG. 2) calculates the amount of time since a last update of an item of data (step 406). The decay engine 205 (FIG. 2) retrieves a current date and time may then compare the current date and time to the retrieved date/time stamp. The amount of time between the two dates and/or times is calculated. For example, the decay engine 205 (FIG. 2) subtracts a value representing the date/time stamp from a value representing the current date and time. Thus, the decay engine 205 (FIG. 2) may determine the amount of time since a last update of one or more items of data involved in a relationship.

The decay engine 205 (FIG. 2) can retrieve one or more decay rules from the decay rules database 214 (FIG. 2) (step 408). The decay rules database 214 (FIG. 2) can include one or more calculations for determining the amount of decay. A decay calculation can be any mathematical formula. The decay calculation could be a logarithmic function, an exponential function, a proportional function, etc. For example, the amount of decay may be measured from 100 to 0 wherein the data decays 1 point per day. Thus, when the data is first updated, the decay is 0% and after 100 days the decay is 100%. The data is out-of-date on day 100.

The database administrator can create the calculation rule. The calculation rule may then be stored in the decay rules 218 (FIG. 2). When determining decay, the decay engine 205 (FIG. 2) can retrieve the calculation rule created by the database administrator. The database administrator may create different calculation rules for different types of data or data relationships. For example, email address decay may be a logarithmic function while address changes are a proportional function. The decay function for relationships may be based on one or more of the items of data associated with the relationship. For example, an address may be related to age. Decay of the address may be more frequent when a person is younger. As such, a first decay calculation may be used for people of a first age and a second calculation for people of a second age.

The decay engine 205 (FIG. 2) uses the calculation rule and the determined amount of time since the last update to determine the decay score (step 410). The decay engine 205 (FIG. 2) may then store the decay metric/score in the decay metric field 310 (FIG. 3). After calculating the decay score, the decay engine 205 (FIG. 2) may then repeat the process for one or more other items of data or relationships. The decay engine 205 (FIG. 2) can also provide the determined decay metric for one or more separate items of data or relationships in a user interface 202 (FIG. 2).

The decay engine 205 (FIG. 2) may retrieve and calculate another calculation rule from the decay rules database 214 (FIG. 2) to calculate the decay for the database 206 (FIG. 2) (step 412). The calculation rule may be a simple average of the decay metrics stored with one or more items of data or relationships. Other types of calculations are possible, for example, weighted average where a database administrator provides the weights, attributes based average, etc.

The decay engine 205 (FIG. 2) reports the decay score for the database to a user in a user interface 202 (FIG. 2) (step 414). In other embodiments, the decay metric 310 (FIG. 3) is stored in data structure 300 (FIG. 3).

Figure 5:
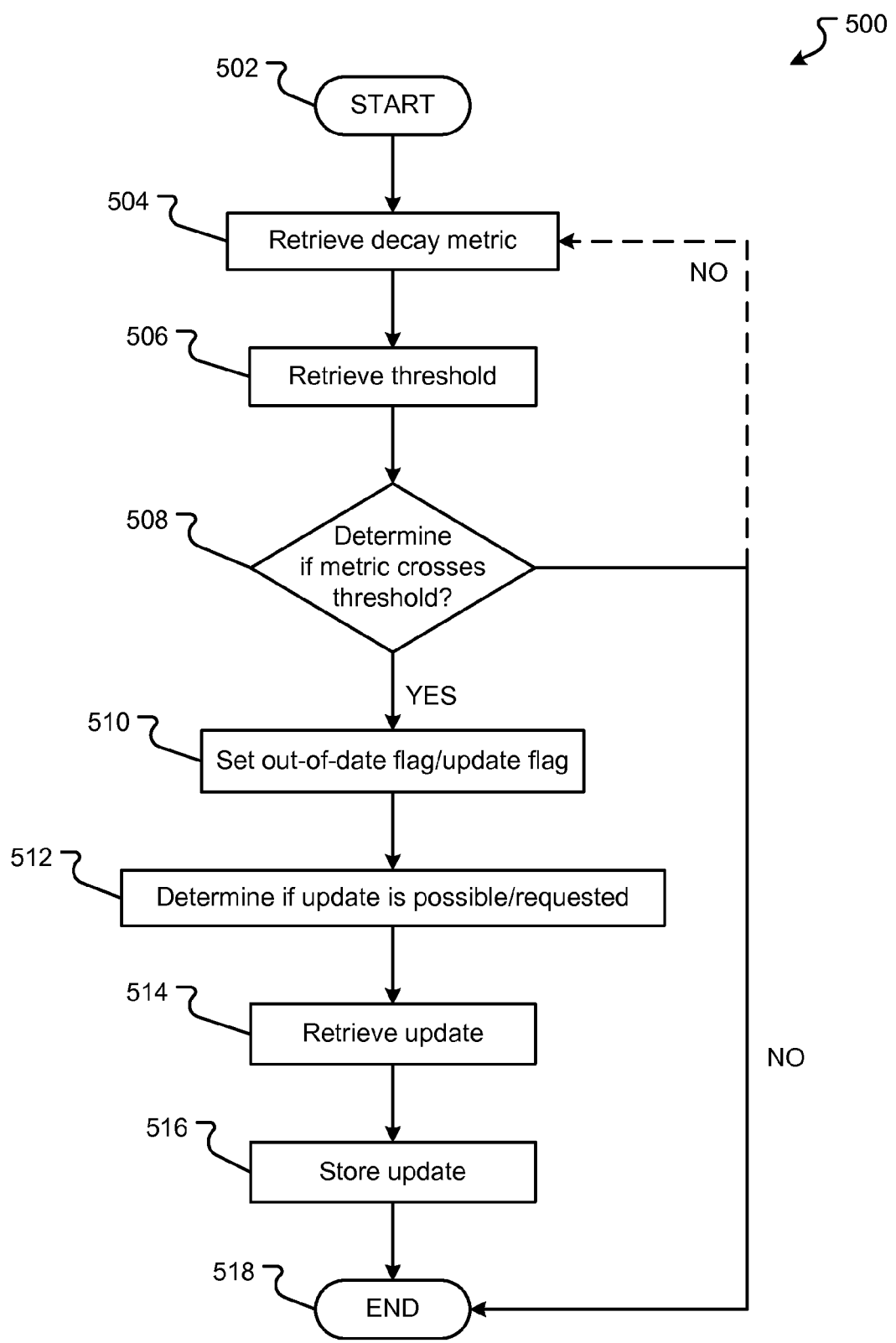
FIG. 5 is a flow diagram of an embodiment of a method for updating stale data.

An embodiment of a method 500 for updating decayed data is shown in FIG. 5. The method 500 generally begins with a START operation 502 and terminates with an END operation 518. The steps shown in the method 500 may be executed in a computer system as a set of computer executable instructions. While a logical order is shown in FIG. 5, the steps shown or described can, in some circumstances, be executed in a different order than presented herein. The method 500 can be automatically executed after a predefined period of time on a periodic basis, for example, once a week or once a month. In another embodiment, a database administrator starts the method by requesting an update of decayed data in user interface 202 (FIG. 2). In still another embodiment, the method 500 is automatically executed in response to the determination that the data is decayed. The method 500 will be explained with respect to the system of FIG. 2 and the example of a data structure in FIG. 3.

An update engine 208 (FIG. 2) retrieves the decay metric 310 (FIG. 3) (step 504). The update engine 208 (FIG. 2) can request the decay metric 310 (FIG. 3) from the database engine 216 (FIG. 2) and the database engine 216 (FIG. 2) retrieves one or more decay metrics 310 (FIG. 3) from the database 206 (FIG. 2).

The update engine 208 (FIG. 2) can then retrieve the threshold (step 506). The update engine 208 (FIG. 2) can request the threshold from the database engine 216 (FIG. 2). The database engine 216 (FIG. 2) retrieves threshold from the database 206 (FIG. 2). The threshold may be associated with the item of data or the data relationship. Therefore, the update engine 208 (FIG. 2) can retrieve one or more thresholds for one or more associated decay metrics 310 (FIG. 3).

The update engine 208 (FIG. 2) compares the decay metric 310 (FIG. 3) to the threshold (step 508). For example, if the decay metric 310 (FIG. 3) is measured on a scale of 100 to 0 where 100 is newly updated data and the threshold is 50, a decay metric 310 (FIG. 3) of 49 or below means that the decay metric 310 (FIG. 3) has crossed the threshold. If the decay metric 310 (FIG. 3) has crossed the threshold, the method 500 flows YES to step 510. If the decay metric 310 (FIG. 3) has not crossed the threshold, the method 500 flows NO to step 518 or, optionally, to step 504 to repeat the process for a different items of data.

The out-of-date flag 306 (FIG. 3) is set by the update engine 208 (FIG. 2) (step 510). In further embodiments, the database administrator sets the update flag 308 (FIG. 3) if the data is to be updated if the data is decayed. If both the out-of-date flag 306 (FIG. 3) and the update flag 308 (FIG. 3) is set, the update engine 208 (FIG. 2) may then recognize that the data needs updating. In other embodiments, the update engine 208 (FIG. 2) sets the update flag 308 (FIG. 3) to acknowledge that the data is decayed and requires an update. By setting the update flag 308 (FIG. 3), the update engine 208 (FIG. 2) may be able to return later to update the data.

Update engine 208 (FIG. 2) determines if an update is possible or requested (step 512). All data may include an update flag, but not all data can be updated. For example, a customer's food preferences may not have another database that can be accessed to find this data. The update engine 208 (FIG. 2) identifies the data that can be updated. The update engine 208 (FIG. 2) can read a flag or other attribute of the data that indicates the data can be updated.

The update engine 208 (FIG. 2) can then receive one or more updates (step 514). The update engine 208 (FIG. 2) accesses one or more external databases 212 (FIG. 2) over one or more networks 210 (FIG. 2). For example, the update engine 208 (FIG. 2) accesses data in a credit agency database, such as Experian®. The update engine 208 (FIG. 2) can download data from the external database 212 (FIG. 2), for example, a new address.

The update engine 208 (FIG. 2) provides the updated data from the external database 212 (FIG. 2) to the database engine 216 (FIG. 2) to store the data (step 516). The provided update may be associated with the data with an identifier. The database engine 216 (FIG. 2) accesses the database object and stores the update. The database object changes the data file with the update. The database engine 216 (FIG. 2) changes the update flag or the out-of-date flag for any data updated.

Figure 6:
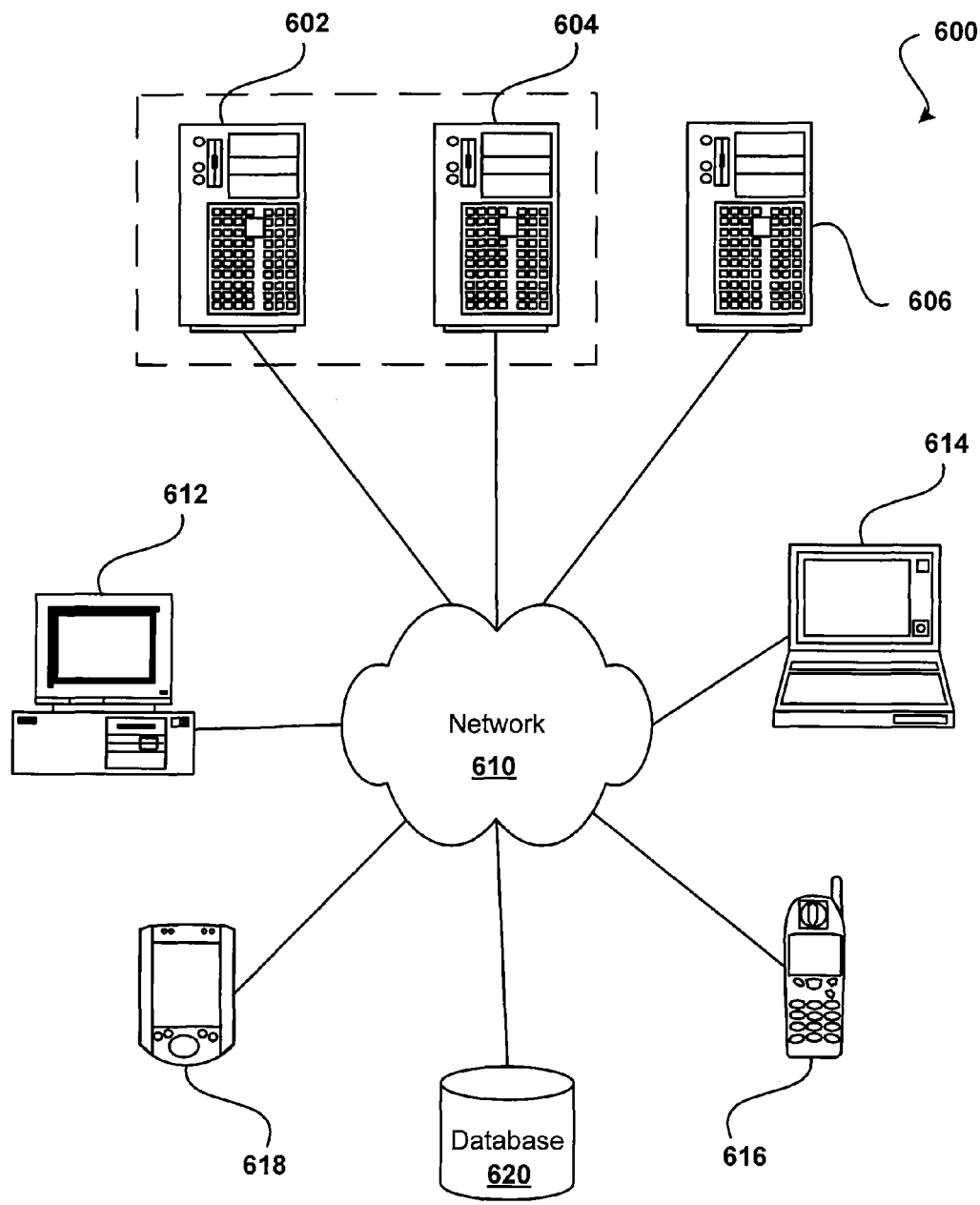
FIG. 6 is a block diagram of an embodiment of a networked computing environment operable to function as a database system.

FIG. 6 is a block diagram illustrating components of an exemplary operating environment in which various embodiments of the present disclosure may be implemented. The system 600 can include one or more user computers, computing devices, or processing devices 612, 614, 616, 618, which can be used to operate a client, such as a dedicated application, web browser, etc. The user computers 612, 614, 616, 618 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 612, 614, 616, 618 may also have any of a variety of applications, including one or more development systems, database client and/or server applications, and Web browser applications. Alternatively, the user computers 612, 614, 616, 618 may be any other electronic device, such as a thin-client computer, Internet-enabled gaming system, and/or personal messaging device, capable of communicating via a network (e.g., the network 610 described below) and/or displaying and navigating Web pages or other types of electronic documents. Although the exemplary system 600 is shown with four user computers, any number of user computers may be supported.

In most embodiments, the system 600 includes some type of network 610. The network may can be any type of network familiar to those skilled in the art that can support data communications using any of a variety of commercially-available protocols, including without limitation TCP/IP, SNA, IPX, AppleTalk™, and the like. Merely by way of example, the network 610 can be a LAN, such as an Ethernet network, a Token-Ring network and/or the like; a WAN a virtual network, including without limitation a virtual private network (VPN); the Internet; an intranet; an extranet; a public switched telephone network (PSTN); an infra-red network; a wireless network (e.g., a network operating under any of the IEEE 802.11 suite of protocols, GRPS, GSM, UMTS, EDGE, 2G, 2.9G, 3G, 4G, Wimax, WiFi, CDMA 2000, WCDMA, the Bluetooth protocol known in the art, and/or any other wireless protocol); and/or any combination of these and/or other networks.

The system may also include one or more server computers 602, 604, 606 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 606) may be dedicated to running applications, such as a business application, a Web server, application server, etc. Such servers may be used to process requests from user computers 612, 614, 616, 618. The applications can also include any number of applications for controlling access to resources of the servers 602, 604, 606.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java® servers, business applications, and the like. The server(s) also may be one or more computers which can be capable of executing programs or scripts in response to the user computers 612, 614, 616, 618. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 612, 614, 616, 618.

The system 600 may also include one or more databases 620. The database(s) 620 may reside in a variety of locations. By way of example, a database 620 may reside on a storage medium local to (and/or resident in) one or more of the computers 602, 604, 606, 612, 614, 616, 618. Alternatively, it may be remote from any or all of the computers 602, 604, 606, 612, 614, 616, 618, and/or in communication (e.g., via the network 610) with one or more of these. In a particular set of embodiments, the database 620 may reside in a storage-area network (SAN) familiar to those skilled in the art. Similarly, any necessary files for performing the functions attributed to the computers 602, 604, 606, 612, 614, 616, 618 may be stored locally on the respective computer and/or remotely, as appropriate. In one set of embodiments, the database 620 may be a relational database, such as Oracle® 10g, that is adapted to store, update, and retrieve data in response to SQL-formatted commands.

Figure 7:
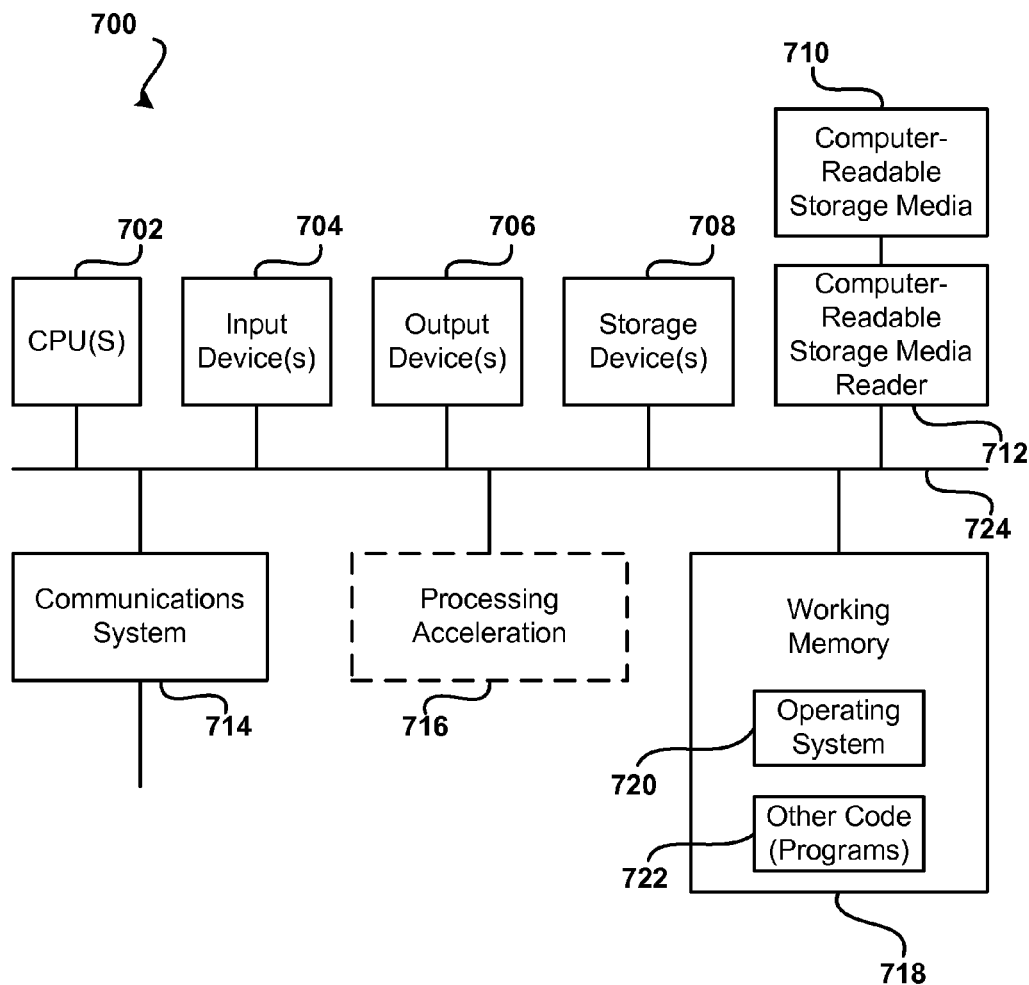
FIG. 7 is a block diagram of an embodiment of computer or computing system operable to function as one or more components in the database system.

FIG. 7 illustrates an exemplary computer system 700, in which various embodiments of the present invention may be implemented. The system 700 may be used to implement any of the computer systems described above. The computer system 700 is shown comprising hardware elements that may be electrically coupled via a bus 724. The hardware elements may include one or more central processing units (CPUs) 702, one or more input devices 704 (e.g., a mouse, a keyboard, etc.), and one or more output devices 706 (e.g., a display device, a printer, etc.). The computer system 700 may also include one or more storage devices 708. By way of example, the storage device(s) 708 can include devices such as disk drives, optical storage devices, solid-state storage device such as a random access memory ("RAM") and/or a read-only memory ("ROM"), which can be programmable, flash-updateable and/or the like.

The computer system 700 may additionally include a computer-readable storage media reader 712, a communications system 714 (e.g., a modem, a network card (wireless or wired), an infra-red communication device, etc.), and working memory 718, which may include RAM and ROM devices as described above. In some embodiments, the computer system 700 may also include a processing acceleration unit 716, which can include a digital signal processor (DSP), a special-purpose processor, and/or the like.

The computer-readable storage media reader 712 can further be connected to a computer-readable storage medium 710, together (and, optionally, in combination with storage device(s) 708) comprehensively representing remote, local, fixed, and/or removable storage devices plus storage media for temporarily and/or more permanently containing, storing, transmitting, and retrieving computer-readable information. The communications system 714 may permit data to be exchanged with the network and/or any other computer described above with respect to the system 700.

The computer system 700 may also comprise software elements, shown as being currently located within a working memory 718, including an operating system 720 and/or other code 722, such as an application program (which may be a client application, Web browser, mid-tier application, RDBMS, etc.). It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as but not limited to volatile and non-volatile, removable and non-removable media implemented in any method or technology for storage and/or transmission of information, such as, computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

Figure 8:
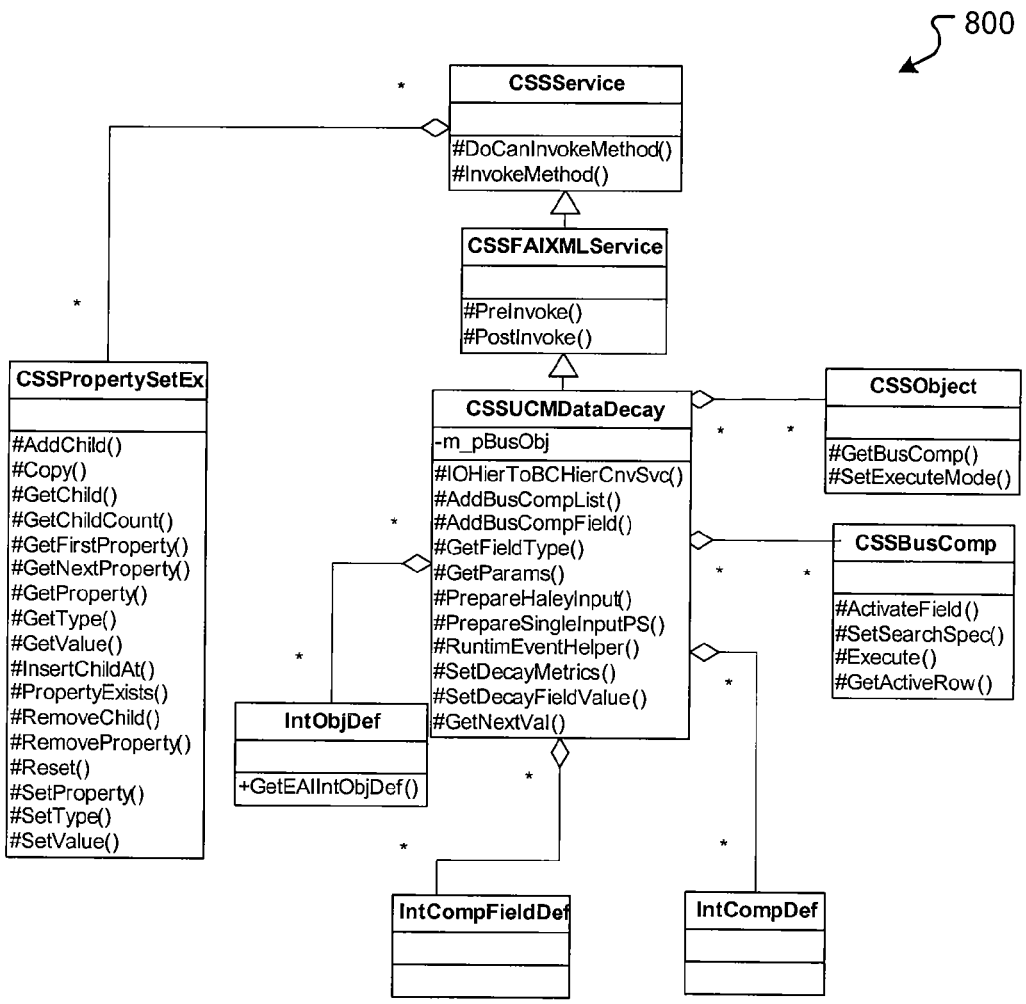
FIG. 8 is a hierarchical diagram of an embodiment of a class hierarchy representing the software for managing data decay.

An exemplary class hierarchy 800 for an embodiment of software for effectuating the decay engine 204 (FIG. 2) is shown in FIG. 8. The class hierarchy has functionality as described in Table 1 below:

TABLE 1

Exemplary software classes

| Class | Method | Input/Output | Function |
|---|---|---|---|
| CSSUCMDataDecay | CreateDecayFieldMap | IO | Works in tandem with runtime events to create a map of fields being tracked for Decay |
| | SetDecayMetrics | IO | Sets Decay Metrics for fields specified in Context parameter, or reads the map created CreateDecayFieldMap for the fields whose decay metrics need to be set |
| | PrepareSingleInputPS | IO | Prepares XML Hierarchy property set for the input having single record, consisting of the record ID and Business Component Name |
| | PrepareHaleyInput | IO | Prepares simple input for Haley rule engine based on above XML Hierarchy |
| | DecayCorrectionNotifier | IO | Used to notify the owner of decayed records to take correctness action by posting messages in the application inbox/Home Page of record owner(s) |

Embodiments presented herein have several advantages. Namely, the decay engine 204 (FIG. 2) can provide a database user with information about the how useful the database information is. For example, if the data is stale or decayed, the database user knows not to rely on the data. Further, knowing that the data is stale allows a database user to update the data, which can be done automatically. Thus, the data decay can be remediated with active updating of stale data.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:
1. A computer-implemented method for determining decay for an item of data in a database, the method comprising:
  retrieving, by a computer system, a date/time stamp from the database for each of a plurality of items of data previously stored in the database, wherein the date/time stamp indicates a last update for a record storing the item of data in the database;
  calculating, by the computer system, a time from the last update of each of the plurality of items of data previously stored in the database based on the date/time stamp;
  retrieving, by the computer system, one or more decay rules;
  calculating, by the computer system, an individual decay score for each of the plurality of items of data previously stored in the database based on the time from the last update of each of the plurality of items and according to the one or more decay rules for a data type of the items of data, the decay score indicating a relative staleness of each of the plurality of items based on a data type of each of the plurality of items;
  reporting, by the computer system, the individual decay score for each of the plurality of items of data to the user interface;
  determining, by the computer system, whether the individual decay score for each of the plurality of items of data crosses a threshold;
  setting, by the computer system, an out-of-date flag for an item of data when the decay score for that item of data crossed the threshold;
  storing, by the computer system, the individual decay score for each of the plurality of items of data as a decay metric;
  retrieving, by the computer system, the decay metric for each of the plurality of items of data;
  retrieving, by the computer system, a threshold;
  determining, by the computer system, whether any of the decay metrics cross the threshold;
  when the decay metric for an item of data crosses the threshold, retrieving, by the computer system, an update for the item of data;
  storing, by the computer system, the update for the item of data in the database; and
  updating, by the computer system, the date/time stamp for the item of data in the database to indicate a date/time of the storing of the update.
2. The method as defined in claim 1, further comprising:
  determining, by the computer system, an overall decay score for all of the database based on the decay scores of each of the plurality of items of data in the database; and
  reporting, by the computer system, the decay score for all of the database.

3. The method as defined in claim 1, wherein the one or more decay rules includes a decay calculation.

4. The method as defined in claim 3, wherein the decay calculation is one of a linear function, logarithmic function, or exponential function.

5. The method as defined in claim 2, wherein the individual decay score for each of the plurality of items of data and the overall decay score for all of the database are calculated periodically.

6. The method as defined in claim 1, further comprising calculating, by the computer system, a decay score for one or more relationships between two or more items of data.

7. A computer system for managing data decay in a database, comprising:
 a processor; and
 a memory device in communication with the processor and encoded with a database program that causes the processor to execute:
 the database;
 a decay engine in communication with the database, the decay engine operable to cause the processor to determine decay in the database by:
  retrieving a date/time stamp from the database for each of a plurality of items of data previously stored in the database, wherein the date/time stamp indicates a last update of a record storing the item of data in the database;
  calculating a time from the last update of each of the plurality of items of data previously stored in the database based on the date/time stamp;
  retrieving one or more decay rules;
  calculating an individual decay score for each of the plurality of items of data previously stored in the database based on the time from the last update of each of the plurality of items and according to the one or more decay rules for a data type of the items of data, the decay score indicating a relative staleness of each of the plurality of items based on a data type of each of the plurality of items;
  storing the individual decay score for each of the plurality of items of data as a decay metric for the item of data;
  reporting the individual decay score for each of the plurality of items of data;
  determining an overall decay score for all of the database based on the individual decay scores of each of the plurality of items of data previously stored in the database; and
  storing the overall decay score for all of the database; and
 an update engine in communication with the database, the update engine operable to cause the processor to update decayed data stored in the database by:
  retrieving the decay metric for each of the plurality of items of data;
  retrieving a threshold;
  determining whether any of the decay metrics cross the threshold;
  when the decay metric for an item of data crosses the threshold, setting an out-of-date flag for an item of data and retrieving an update for the item of data previously stored in the database;
  storing the update for the item of data in the database; and
  updating the date/time stamp for the item of data in the database to indicate a date/time of the storing of the update.

8. The computer system as defined in claim 7, further comprising:
 a decay rules database in communication with the decay engine, the decay rules database operable to store the one or more decay rules.

9. The computer system as defined in claim 8, further comprising a database engine, the database engine in communication with the decay engine and the update engine, the database engine receiving one or more requests from the decay engine and the update engine, the database engine providing one or more data files to the decay engine and the update engine.

10. The computer system as defined in claim 7, wherein the update engine is in communication with one or more external databases, the update engine operable to receive the update for the item of data from the one or more external databases.

11. The computer system as defined in claim 7, wherein a database administrator creates the one or more decay rules.

12. The computer system as defined in claim 7, wherein the database comprises one or more items of metadata, the metadata comprising:
 a date stamp field, the date stamp field storing a date for the date/time stamp, wherein the date is a date of a last update;
 a time stamp field, the time stamp field storing a time for the date/time stamp, wherein the time is a time of a last update; and
 a decay metric field, the decay metric field storing the decay score as a decay metric.

13. The computer system as defined in claim 12, the metadata further comprising:
 an out-of-date flag field, the out-of-date flag field storing an out-of-date flag that represents to the update engine that the item of data needs to be updated; and
 an update flag field, the update flag field storing an update flag that represents to the update engine that a user wants the item of data to be updated when the out-of-date flag is set.

14. The computer system as defined in claim 13, wherein one or more of the metadata is associated with one or more items of data and one or more relationships between two or more items of data.

15. A non-transitory computer-readable memory having stored thereon a sequence of instructions which, when executed by a processor, cause the processor to update decayed data in a database by:
 retrieving a date/time stamp from the database for each of a plurality of items of data previously stored in the database, wherein the date/time stamp indicates a last update for a record storing the item of data in the database;
 calculating a time from the last update of each of the plurality of items of data previously stored in the database based on the date/time stamp;
 retrieving one or more decay rules;
 calculating an individual decay score for each of the plurality of items of data previously stored in the database based on the time from the last update of each of the plurality of items and according to the one or more decay rules for a data type of the items of data, the decay score indicating a relative staleness of each of the plurality of items based on a data type of each of the plurality of items;
 storing the decay score for each of the plurality of items of data as a decay metric for the item of data;
 reporting the individual decay score for each of the plurality of items of data;

determining an overall decay score for all of the database based on the individual decay scores of each of the plurality of items of data previously stored in the database;

storing the decay score for all of the database;

retrieving the decay metric for a first item of data previously stored in the database;

retrieving a threshold associated with the item of data;

determining whether the decay metric crosses the threshold;

when the decay metric crosses the threshold, setting an out-of-date flag for an item of data and retrieving an update for the item of data;

when the decay metric does not cross the threshold, retrieving a decay metric for a second item of data;

storing the update for the first item of data in the database; and updating the date/time stamp for the item of data in the database to indicate a date/time of the storing of the update.

16. The computer-readable memory as defined in claim 15, further comprising setting an out-of-date flag when the decay metric crosses the threshold.

17. The computer-readable memory as defined in claim 16, further comprising:

determining whether an update flag is set for the first item of data; and determining whether an update is requested on the first item of data, wherein the update is requested when the update flag is set.

18. The computer-readable memory as defined in claim 15, further comprising retrieving the update from one of one or more external databases.

* * * * *

UNITED STATES PATENT AND TRADEMARK OFFICE
CERTIFICATE OF CORRECTION

PATENT NO. : 8,452,733 B2  
APPLICATION NO. : 12/253788  
DATED : May 28, 2013  
INVENTOR(S) : Chan et al.

It is certified that error appears in the above-identified patent and that said Letters Patent is hereby corrected as shown below:

In the Specification:

In column 4, line 12, delete "106" and insert -- 106. --, therefor.

In column 4, line 29, after "engine" delete "504".

In column 9, line 15, delete "GRPS," and insert -- GPRS, --, therefor.

In the Claims:

In column 13, line 5, In Claim 4, before "exponential" insert -- an --.

In column 14, line 67, In Claim 15, delete "data:" and insert -- data; --, therefor.

Signed and Sealed this  
First Day of October, 2013

Teresa Stanek Rea  
*Deputy Director of the United States Patent and Trademark Office*